US012555589B2

(12) United States Patent
Tyagi et al.

(10) Patent No.: US 12,555,589 B2
(45) Date of Patent: Feb. 17, 2026

(54) SPATIAL NOISE FILLING IN MULTI-CHANNEL CODEC

(71) Applicant: Dolby Laboratories Licensing Corporation, San Francisco, CA (US)

(72) Inventors: Rishabh Tyagi, Sydney (AU); Michael Eckert, Ashfield (AU)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 295 days.

(21) Appl. No.: 18/255,506

(22) PCT Filed: Dec. 1, 2021

(86) PCT No.: PCT/US2021/061441
§ 371 (c)(1),
(2) Date: Jun. 1, 2023

(87) PCT Pub. No.: WO2022/119946
PCT Pub. Date: Jun. 9, 2022

(65) Prior Publication Data

US 2024/0105192 A1 Mar. 28, 2024

Related U.S. Application Data

(60) Provisional application No. 63/283,187, filed on Nov. 24, 2021, provisional application No. 63/120,658, filed on Dec. 2, 2020.

(51) Int. Cl.
*G10L 19/03* (2013.01)
*G10L 19/008* (2013.01)
*G10L 21/0216* (2013.01)

(52) U.S. Cl.
CPC ............ *G10L 19/03* (2013.01); *G10L 19/008* (2013.01); *G10L 21/0216* (2013.01)

(58) Field of Classification Search
CPC ... G10L 19/03; G10L 21/0208; G10L 19/008; G10L 21/0216; G10L 19/02; G10L 19/06
See application file for complete search history.

(56) References Cited

U.S. PATENT DOCUMENTS 7,761,290 B2 7/2010 Koishida
8,090,586 B2 1/2012 Oh
(Continued)

FOREIGN PATENT DOCUMENTS

JP 2016530557 A 9/2016
JP 2019509511 A 4/2019
(Continued)

*Primary Examiner* — Yogeshkumar Patel

(57) ABSTRACT

Embodiments are disclosed for spatial noise filling in multi-channel codecs. In an embodiment, a method of regenerating background noise ambience in a multi-channel codec by generating spatial hole filling noise comprises: computing noise estimates based on a primary downmix channel generated from an input audio signal representing a spatial audio scene with background noise ambience; computing spectral shaping filter coefficients based on the noise estimates; spectrally shaping the multi-channel noise signal using the spectral shaping filter coefficients and a noise distribution, the spectral shaping resulting in a diffused, multi-channel noise signal with uncorrelated channels; spatially shaping the diffused, uncorrelated multi-channel noise signal with uncorrelated channels based on a noise ambience of the spatial audio scene; and adding the spatially and spectrally shaped multi-channel noise to a multi-channel codec output to synthesize the background noise ambience of the spatial audio scene.

3 Claims, 5 Drawing Sheets

(56) References Cited

U.S. PATENT DOCUMENTS

| | | | | |
|---|---|---|---|---|
| 9,111,532 | B2 | 8/2015 | Taleb | |
| 9,741,354 | B2 | 8/2017 | Koishida | |
| 10,236,007 | B2 | 3/2019 | Disch | |
| 10,332,535 | B2 | 6/2019 | Disch | |
| 10,347,274 | B2 | 7/2019 | Disch | |
| 10,529,348 | B2 | 1/2020 | Disch | |
| 10,607,629 | B2 | 3/2020 | Koppens | |
| 2016/0027447 | A1 * | 1/2016 | Dickins | H04M 3/568<br>704/228 |
| 2019/0189137 | A1 | 6/2019 | Disch | |
| 2020/0265852 | A1 | 8/2020 | Schnell | |
| 2020/0357418 | A1 * | 11/2020 | Dick | G10L 19/028 |
| 2020/0357421 | A1 | 11/2020 | Fuchs | |
| 2021/0343300 | A1 * | 11/2021 | Küch | G10L 19/008 |

FOREIGN PATENT DOCUMENTS

| | | | | |
|---|---|---|---|---|
| WO | 2019166317 | A1 | 9/2019 | |
| WO | WO-2020152154 | A1 * | 7/2020 | G10L 19/008 |
| WO | 2020206344 | A1 | 10/2020 | |

* cited by examiner

SPATIAL NOISE FILLING IN MULTI-CHANNEL CODEC

CROSS REFERENCE TO RELATED APPLICATIONS

This application is a U.S. National Stage application under U.S.C. 371 of International Application No. PCT/US2021/061441, filed on Dec. 1, 2021, which claims priority to U.S. Provisional Application No. 63/120,658, filed 2 Dec. 2020 and U.S. Provisional Application 63/283,187, filed 24 Nov. 2021, all of which are incorporated herein by reference in their entirety.

TECHNICAL FIELD

This disclosure relates generally to audio processing in an immersive voice and audio context.

BACKGROUND

Voice and audio encoder/decoder ("codec") standard development has recently focused on developing a multi-channel codec for immersive voice and audio services (IVAS). IVAS is expected to support a range of audio service capabilities, including but not limited to mono to stereo upmixing and fully immersive audio encoding, decoding and rendering. IVAS is intended to be supported by a wide range of devices, endpoints, and network nodes, including but not limited to: mobile and smart phones, electronic tablets, personal computers, conference phones, conference rooms, virtual reality (VR) and augmented reality (AR) devices, home theatre devices, and other suitable devices. These devices, endpoints and network nodes can have various acoustic interfaces for sound capture and rendering. The ability of a multi-channel codec to regenerate the encoder input audio scene at a decoder output depends on the number of downmix channels being coded, the coding artifacts introduced by mono codecs, the ability of the decorrelator used in the decoder to output uncorrelated downmix channels with respect to a primary downmix channel and the correctness of side information being coded. At low bitrates due to lack of bits there is often a trade-off between preserving audio essence and preserving background noise ambience of the input scene. Maintaining audio essence is perceptually more important and hence it leads to background noise ambience collapse.

SUMMARY

Embodiments are disclosed for spatial noise filling in a multi-channel codec. In an embodiment, spatial noise filling comprises: generating multi-channel noise with a desired spatial and spectral shape with minimal or no additional information from the encoder; adding the multi-channel noise to the final upmixed output at the decoder to regenerate the background noise ambience and fill the spatial holes. The spectral shape of multi-channel noise is determined by a primary downmix channel that is a representation of, for example, the W channel for a first order Ambisonics (FoA) input signal format, and a representation of the Mid channel for mid side (M/S) input signal format. The spatial shape of the multi-channel noise is determined by the spatial information from the input spatial audio scene. This spatial information can be extracted either from the side information (extracted spatial metadata) sent by the encoder or from the spatial characteristics of the upmixed output at the decoder or both. In an embodiment, the spatial shape of multi-channel noise is extracted from both the side information (spatial metadata) sent by encoder and from the spatial characteristics of upmixed output at the decoder.

Other embodiments disclosed herein are directed to a system, apparatus and computer-readable medium. The details of the disclosed embodiments are set forth in the accompanying drawings and the description below. Other features, objects and advantages are apparent from the description, drawings and claims.

Particular embodiments disclosed herein provide one or more of the following advantages. The disclosed spatial noise filling technique addresses the problem of noise ambience collapse at low bitrates in multi-channel codecs by improving the perceived ambience of a multi-channel audio signal.

DESCRIPTION OF DRAWINGS

In the drawings, specific arrangements or orderings of schematic elements, such as those representing devices, units, instruction blocks and data elements, are shown for ease of description. However, it should be understood by those skilled in the art that the specific ordering or arrangement of the schematic elements in the drawings is not meant to imply that a particular order or sequence of processing, or separation of processes, is required. Further, the inclusion of a schematic element in a drawing is not meant to imply that such element is required in all embodiments or that the features represented by such element may not be included in or combined with other elements in some embodiments.

Further, in the drawings, where connecting elements, such as solid or dashed lines or arrows, are used to illustrate a connection, relationship, or association between or among two or more other schematic elements, the absence of any such connecting elements is not meant to imply that no connection, relationship, or association can exist. In other words, some connections, relationships, or associations between elements are not shown in the drawings so as not to obscure the disclosure. In addition, for ease of illustration, a single connecting element is used to represent multiple connections, relationships or associations between elements. For example, where a connecting element represents a communication of signals, data, or instructions, it should be understood by those skilled in the art that such element represents one or multiple signal paths, as may be needed, to affect the communication.

The same reference symbol used in various drawings indicates like elements.

DETAILED DESCRIPTION

In the following detailed description, numerous specific details are set forth to provide a thorough understanding of the various described embodiments. It will be apparent to one of ordinary skill in the art that the various described embodiments may be practiced without these specific details. In other instances, well-known methods, procedures, components, and circuits, have not been described in detail so as not to unnecessarily obscure aspects of the embodiments. Several features are described hereafter that can each be used independently of one another or with any combination of other features.

Nomenclature

As used herein, the term "includes" and its variants are to be read as open-ended terms that mean "includes, but is not limited to." The term "or" is to be read as "and/or" unless the context clearly indicates otherwise. The term "based on" is to be read as "based at least in part on." The term "one example embodiment" and "an example embodiment" are to be read as "at least one example embodiment." The term "another embodiment" is to be read as "at least one other embodiment." The terms "determined," "determines," or "determining" are to be read as obtaining, receiving, computing, calculating, estimating, predicting or deriving. In addition, in the following description and claims, unless defined otherwise, all technical and scientific terms used herein have the same meaning as commonly understood by one of ordinary skills in the art to which this disclosure belongs.

IVAS Use Case Examples

Figure 1:
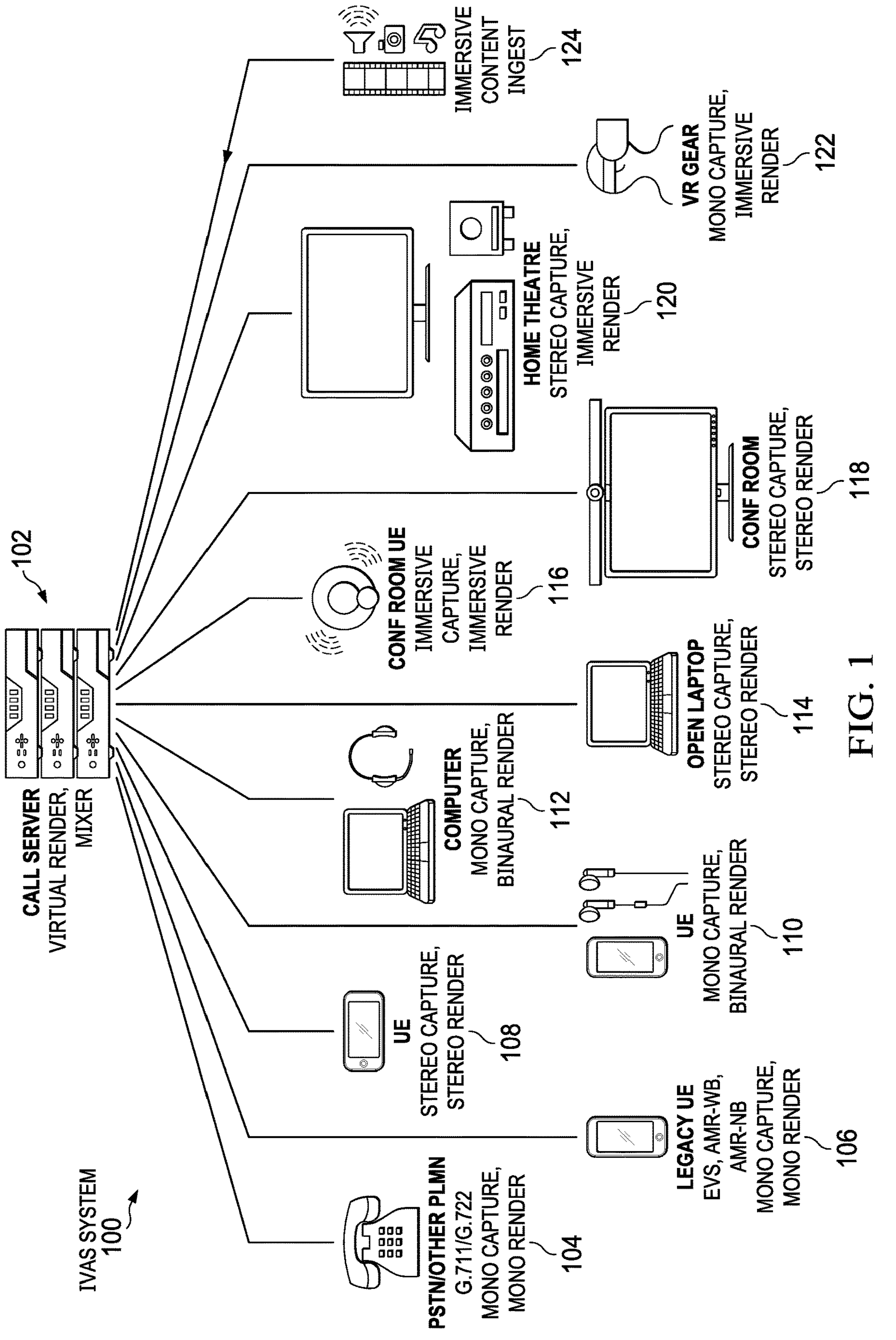
FIG. 1 illustrates use cases for an IVAS system, according to an embodiment.

FIG. 1 illustrates use cases for an IVAS system 100, according to an embodiment. In some embodiments, various devices communicate through call server 102 that is configured to receive audio signals from, for example, a public switched telephone network (PSTN) or a public land mobile network device (PLMN) illustrated by PSTN/OTHER PLMN 104. Use cases support legacy devices 106 that render and capture audio in mono only, including but not limited to: devices that support enhanced voice services (EVS), multi-rate wideband (AMR-WB) and adaptive multi-rate narrowband (AMR-NB). Use cases also support user equipment (UE) 108, 114 that captures and renders stereo audio signals, or UE 110 that captures and binaurally renders mono signals into multi-channel signals. Use cases also support immersive and stereo signals captured and rendered by video conference room systems 116, 118, respectively. Use cases also support stereo capture and immersive rendering of stereo audio signals for home theatre systems 120, and computer 112 for mono capture and immersive rendering of audio signals for virtual reality (VR) gear 122 and immersive content ingest 124.

Example IVAS Codec

Figure 2:
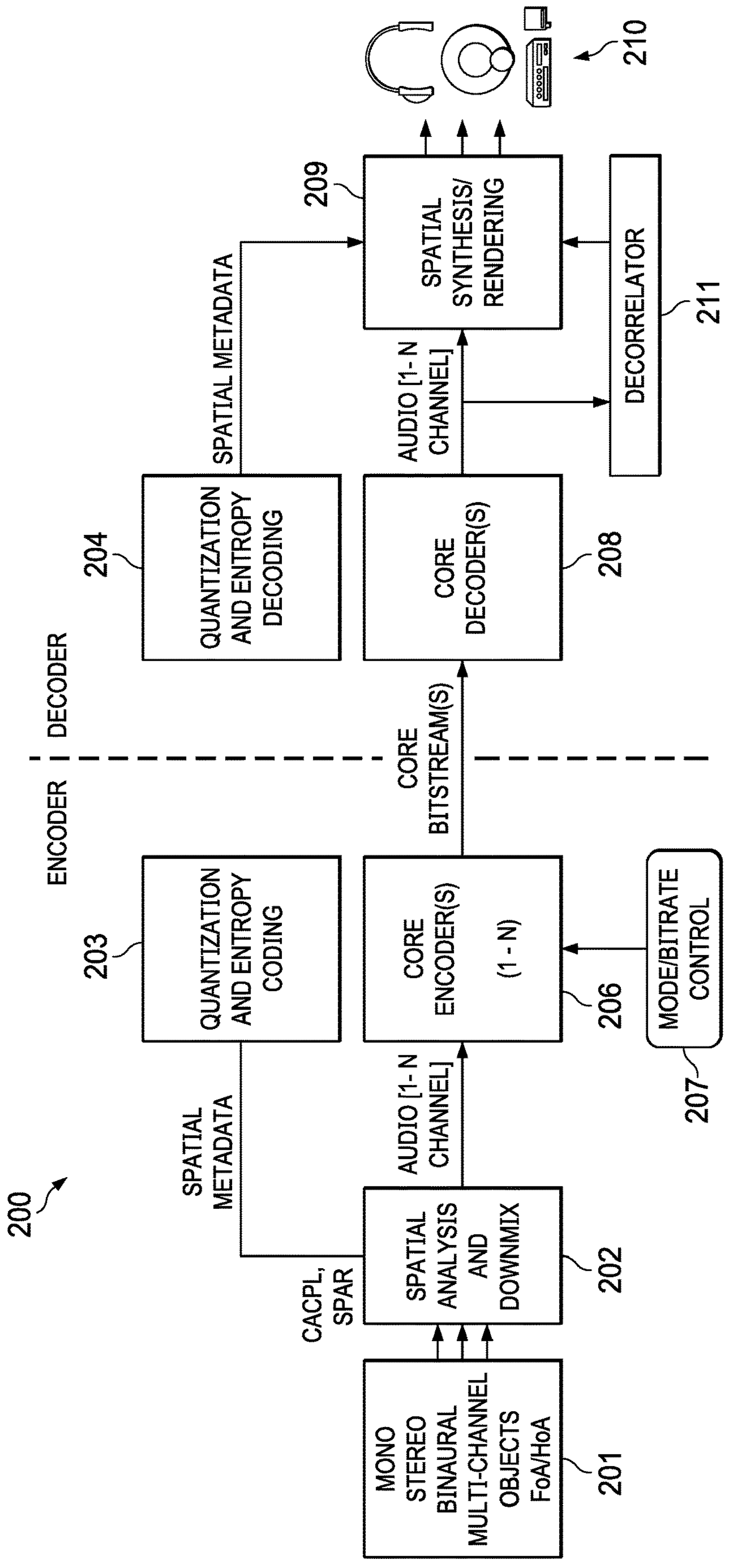
FIG. 2 is a block diagram of a multi-channel codec, according to an embodiment.

FIG. 2 is a block diagram of IVAS codec 200 for encoding and decoding IVAS bitstreams, according to an embodiment. IVAS codec 200 includes an encoder and far end decoder. The IVAS encoder includes spatial analysis and downmix unit 202, quantization and entropy coding unit 203, core encoding unit 206 (e.g., an EVS encoding unit) and mode/bitrate control unit 207. The IVAS decoder includes quantization and entropy decoding unit 204, core decoding unit 208 (e.g., an EVS decoding unit), spatial synthesis/rendering unit 209 and decorrelator unit 211.

Spatial analysis and downmix unit 202 receives N-channel input audio signal 201 representing an audio scene. Input audio signal 201 includes but is not limited to: mono signals, stereo signals, binaural signals, spatial audio signals (e.g., multi-channel spatial audio objects), FoA, higher order Ambisonics (HoA) and any other audio data. The N-channel input audio signal 201 is downmixed to a specified number of downmix channels (N_dmx) by spatial analysis and downmix unit 202. In this example, N_dmx is <=N. Spatial analysis and downmix unit 202 also generates side information (e.g., spatial metadata) that can be used by a far end IVAS decoder to synthesize the N-channel input audio signal 201 from the N_dmx downmix channels, spatial metadata and decorrelation signals generated at the decoder. In some embodiments, spatial analysis and downmix unit 202 implements complex advanced coupling (CACPL) for analyzing/downmixing stereo/FoA audio signals and/or spatial reconstructor (SPAR) for analyzing/downmixing FoA audio signals. In other embodiments, spatial analysis and downmix unit 202 implements other formats.

The N_dmx channels are coded by N_dmx instances of mono codecs included in core encoding unit 206 and the side information (e.g., spatial metadata (MD)) is quantized and coded by quantization and entropy coding unit 203. The coded bits are then packed together into bitstream(s) and sent to the IVAS decoder. Although in the embodiment shown, an example embodiment of the underlying codec is EVS, any suitable mono, stereo or multi-channel codec can be used to generate encoded bitstreams.

In some embodiments, quantization can include several levels of increasingly coarse quantization (e.g., fine, moderate, coarse and extra coarse quantization), and entropy coding can include Huffman or Arithmetic coding.

In some embodiments, core encoding unit 206 is an EVS encoding unit 206 that complies with 3GPP TS 26.445 and provides a wide range of functionalities, such as enhanced quality and coding efficiency for narrowband (EVS-NB) and wideband (EVS-WB) speech services, enhanced quality using super-wideband (EVS-SWB) speech, enhanced quality for mixed content and music in conversational applications, robustness to packet loss and delay jitter and backward compatibility to the AMR-WB codec.

In some embodiments, EVS encoding unit 206 includes a pre-processing and mode/bitrate control unit 207 that selects between a speech coder for encoding speech signals and a perceptual coder for encoding audio signals at a specified bitrate based on output of mode/bitrate control unit 207. In some embodiments, the speech encoder is an improved variant of algebraic code-excited linear prediction (ACELP), extended with specialized linear prediction (LP)-based modes for different speech classes. In some embodiments, the perceptual encoder is a modified discrete cosine transform (MDCT) encoder with increased efficiency at low delay/low bitrates and is designed to perform seamless and reliable switching between the speech and audio encoders.

At the decoder, the N_dmx channels are decoded by corresponding N_dmx instances of mono codecs included in core decoding unit 208 and the side information is decoded by quantization and entropy decoding unit 204. A primary downmix channel (e.g. the W channel in an FoA signal format) is fed to decorrelator unit 211 which generates N-N_dmx decorrelated channels. The N_dmx downmix channels, N-N_dmx decorrelated channels and side information are fed to spatial synthesis/rendering unit 209 which uses these inputs to synthesize or regenerate the original N-channel input audio signal. In an embodiment, N_dmx channels are decoded by mono codecs other than EVS. In other embodiments, N_dmx channels are decoded by a combination of one or more multi-channel core coding units and one or more single channel core coding units.

Multi-channel codecs, such as IVAS codec 200, have a problem of noise ambience collapse at low bitrates (hereinafter, also referred to as "spatial holes"). At low bitrates the number of downmix channels is usually very low (e.g., N_dmx=1 downmix channel), and the number of bits available to the mono codec to code the downmix channel(s) is also low. This results in coding artifacts and reduces the overall energy of the background noise, especially in the high frequencies that form the ambience. Also, fewer downmix channels means the decorrelator needs to generate more uncorrelated channels. Typically, decorrelators fail to generate completely uncorrelated channels with desired spectral shape. Finally, side information may get quantized coarsely due to available bit budget. These issues lead to noise ambience collapse or spatial holes and are resolved by modifying the IVAS decoder to implement spatial noise filling, as described below in reference to FIGS. 3 and 4.

Figure 3:
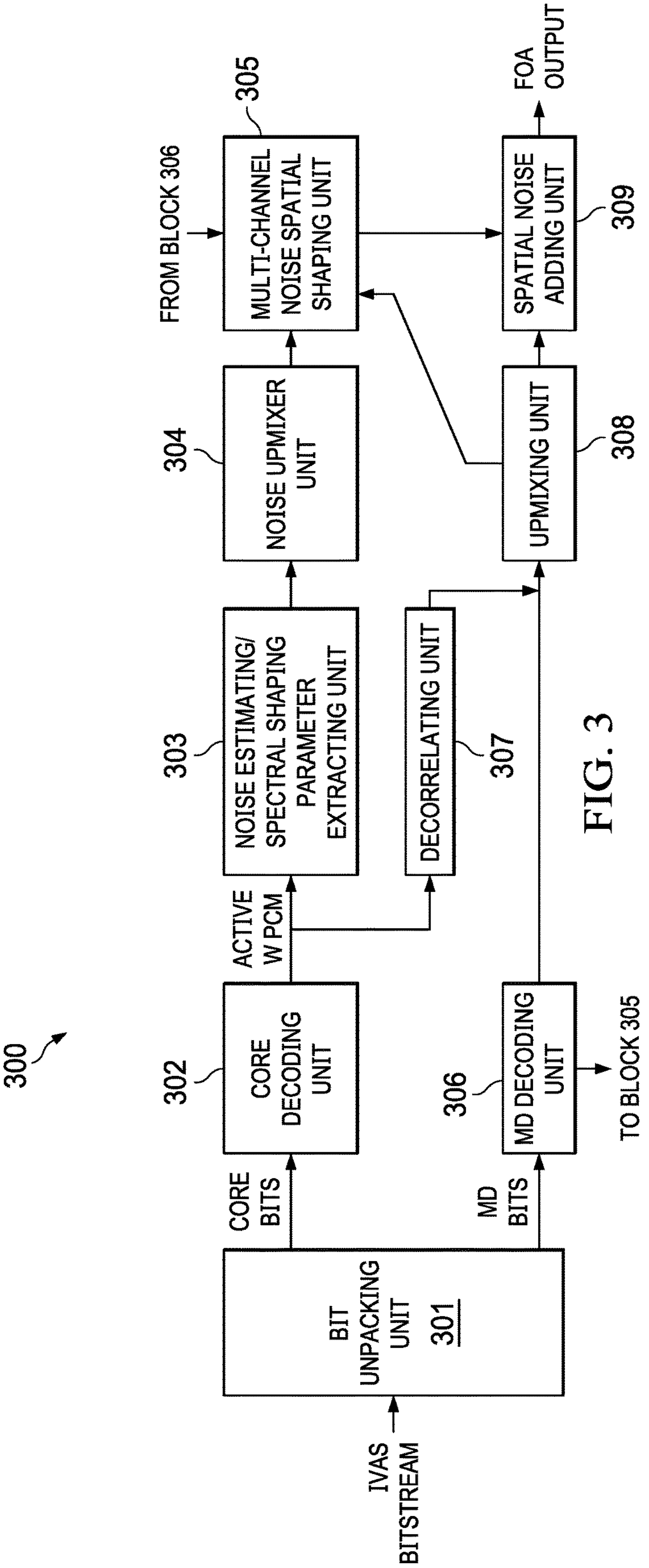
FIG. 3 is a block diagram of a decoder for processing a 1-channel downmix signal using spatial noise filling, according to an embodiment.

FIG. 3 is a block diagram of a IVAS decoder with a 1-channel downmix signal and spatial noise filling, according to an embodiment. The example IVAS decoder shown is a SPAR decoder 300 running in a 1-channel downmix mode (N_dmx=1), which has been configured to decode an encoded IVAS bitstream. Note that the spatial noise filling techniques described below can also be applied to any downmix configuration with any number of downmix signals.

SPAR decoder 300 includes bit unpacking unit 301, core decoding unit 302 (core decoding unit 208 in FIG. 2), noise estimating and spectral shaping parameter extracting unit 303, noise upmixer unit 304, multi-channel noise spatial shaping unit 305, spatial metadata (MD) decoding unit 306 (quantization and entropy decoding unit 204 in FIG. 2), decorrelating unit 307 (decorrelating unit 211 in FIG. 2), upmixing unit 308 (spatial synthesis/rendering unit 209 in FIG. 2) and spatial noise adding unit 309.

Bit unpacking unit 301 receives an encoded IVAS bitstream(s) generated upstream by a IVAS encoder. The IVAS bitstream(s) comprise(s) quantized and encoded spatial metadata (MD) and encoded core coder bits. Bit unpacking unit 301 unpacks the IVAS bitstream(s) and sends the MD bits to MD decoding unit 306 and the core coding bits to core decoding unit 302. In a 1-channel downmix configuration for FoA, the core coding bits only contain W' (representation of W channel) coded bits.

Core decoding unit 302 decodes the core coding bits and generates active W' pulse code modulated (PCM) output data, which gets fed to noise estimating and spectral shaping parameter extracting unit 303 and decorrelating unit 307. Noise estimating and spectral shaping parameter extracting unit 303 reads VAD (Voice Activity Detector)/SAD (Speech Activity Detector) decision flag(s) in the metadata of the bitstream(s) and extracts spectral shape parameters of the background noise when only background noise is present (VAD/SAD decision is 0). Note that the spectral shaping parameters are static when the VAD/SAD decision is 1. In other embodiments, the bits received by block 302 may have been coded by a different core codec other than EVS and so block 302 can be a different core codec other than EVS.

The spectral parameters are fed to noise upmixer unit 304 which generates N uncorrelated noise channels (e.g., N=4 for FoA encoding) with the same spectral shape as the background noise in the W' channel. In an embodiment, these noise channels are generated based on a Gaussian white noise distribution with a different seed for each of the N channels, thereby generating completely uncorrelated noise channels.

Once the spectral shaping parameters are extracted, noise upmixer unit 304 generates multi-channel, uncorrelated noise irrespective of the VAD/SAD decision values. The output of noise upmixer unit 304 is fed to multi-channel noise spatial shaping unit 305 which spatially shapes the uncorrelated N noise channels based on the spatial metadata output by MD decoding unit 306 and/or the spatial parameters extracted from the output of upmixing unit 308 (upmixed SPAR FoA output without spatial noise fill). The spatial parameters of background noise modeling are computed only during inactive frames (e.g., when only background noise is present, i.e., when VAD/SAD decision is 0), but multi-channel noise spatial shaping unit 305 generates spatial noise irrespective of whether the current frame is active or inactive (e.g., VAD/SAD decision is 0 or 1). This is done by freezing the spatial parameters that were computed in the last inactive frame, during active frames). The MD bits output from bit unpacking unit 301 are fed to MD decoding unit 306 which decodes the spatial metadata coded by a IVAS encoder (not shown).

The output of core decoding unit 302 is also fed to decorrelating unit 307 which generates 3 decorrelated outputs (decorrelated with respect to the W' channel of the downmix. The outputs of decorrelating unit 307 and MD decoding unit 306 are fed to upmixing unit 308 which generates FoA output channels from the downmix channel, decorrelated channels output by decorrelating unit 307 and the spatial metadata MD. At high bitrates the output of upmixing unit 308 resembles the FoA input to the SPAR encoder, but at low and medium range bitrates the output of upmixing unit 308 can suffer from ambience collapse.

To prevent ambience collapse, spatial noise adding unit 309 adds spatially and spectrally shaped multi-channel noise with the desired spatial and spectral shape to the output of upmixing unit 308. In some embodiments spatial noise adding unit 309 adds the multi-channel noise with desired spatial and spectral shape to the parametrically generated channels at the outputs of upmixing unit 308. In a 1-channel downmix mode, the Y, X and Z channels are parametrically generated by SPAR 300 decoder with spatial metadata sent from the SPAR encoder, primary downmix channel (W' downmix channel) and the output of decorrelating unit 307, so that the masking noise is added only to the Y, X and Z channels. In a 2-channel downmix mode, the X and Z channels are parametrically generated by SPAR decoder 300 with spatial metadata sent from the SPAR encoder, downmix channels and the output of decorrelating unit 307, so that the masking noise is added only to the X and Z channels. In a 3-channel downmix mode, the Z channel is parametrically generated by SPAR decoder 300 with spatial metadata sent from the SPAR encoder, downmix channels and the output of decorrelating unit 307, so that the masking noise is added only to the Z channel.

In an embodiment, noise upmixer unit 304 generates 4 uncorrelated masking noise channels with the same spectral shape as the background noise in the W' channel and applies a low order high-pass filter to limit the impact of spatial masking noise to high frequencies (as ambience noise collapse is usually perceived more in high frequencies). Noise upmixer unit 304 then applies a smoothing gain to further smooth the impact of spatial masking noise.

In an embodiment, multi-channel noise spatial shaping unit 305 checks the VAD/SAD decision values in the EVS bitstream metadata, takes the output of upmixing unit 308 and passes the output through a high-pass filter to emphasize more on higher frequencies. The high pass filtered output is then used to compute covariance estimates between all 4 channels. The covariance estimates are used to generate spatial parameters which are used to spatially shape the completely diffused (uncorrelated) masking noise. In an embodiment, the covariance estimates are broadband covariance estimates and the spatial parameters are SPAR spatial parameters (e.g., prediction coefficients and decorrelation coefficients). The masking noise shaping parameters are computed only when background noise is present (e.g., the VAD/SAD decision is zero) and are otherwise static when voice or audio is present in the input audio signal (e.g., the VAD/SAD decision is 1).

In an embodiment, multi-channel noise spatial shaping unit 305 checks the VAD/SAD decision output and spatially shapes the output of noise upmixer unit 304 using decoded spatial MD generated by MD decoding unit 306. In an embodiment the spatial MD output of MD decoding unit 306 is further smoothed and recomputed to emphasize more on higher frequencies (e.g., high-pass filtered) before it is applied to the output of noise upmixer unit 304. The multi-channel noise spatial shaping parameters are computed only when only background noise is present (e.g., the VAD/SAD decision is 0) and is static when voice or sound is detected (e.g., the VAD/SAD decision is 1).

In an embodiment, spatial noise adding unit 309 adds the multi-channel noise with desired spatial and spectral shape only to the parametrically generated channels at the multi-channel decoder output. In an embodiment, spatial noise filling can be done with any multi-channel codec other than IVAS or SPAR with N channel multi-channel input (where N>=1). The same spatial noise filling approach can be applied where the multi-channel noise is spectrally shaped based on the primary channel and the spatial shape of the multi-channel noise is determined by either spatial metadata sent by encoder or synthesized multichannel output or both. The multi-channel noise with desired spectral and spatial shape can then be added to synthesized multi-channel output at the decoder.

Figure 4:
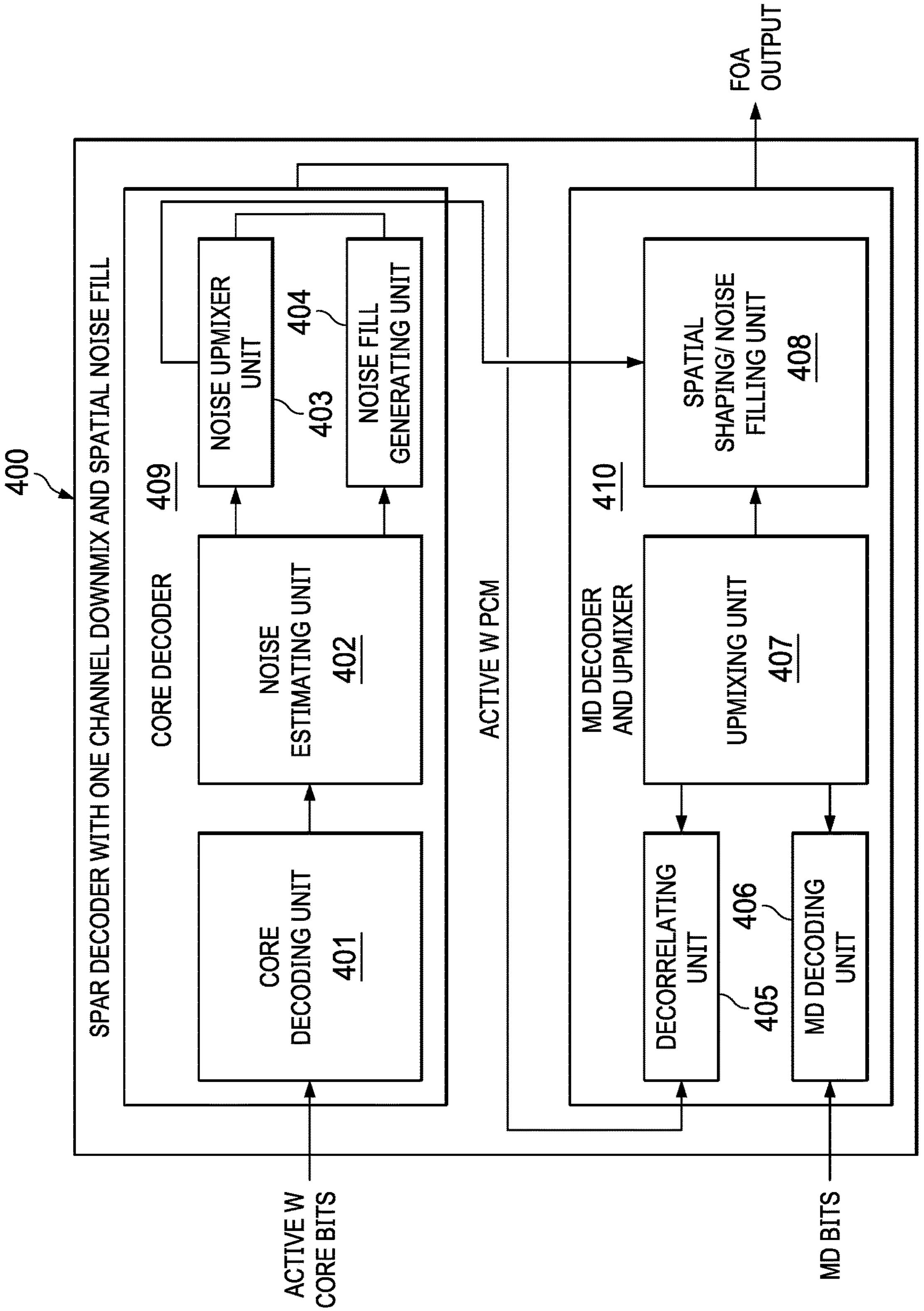
FIG. 4 is a block diagram of a decoder for processing a 1-channel downmix signal using spatial noise filling with noise spectral shaping, according to an embodiment.

FIG. 4 is a block diagram of SPAR decoder 400 operating with 1-channel downmix configuration and spatial noise filling using the core codec's internal module to extract spectral characteristics of the background noise in the downmix channel, according to an embodiment. The following description of a further embodiment will focus on the differences between it and the previously described embodiment. Therefore, features which are common to both embodiments may be omitted from the following description, and so it should be assumed that features of the previously described embodiment are or at least can be implemented in the further embodiment, unless the following description thereof requires otherwise.

SPAR decoder 400 includes core decoder 409 and MD decoder and upmixer 410. Core decoder 409 includes core decoding unit 401, noise estimating unit 402, noise upmixer unit 403 and single channel noise fill unit 404. This single channel noise fill unit 404 is already present in core decoder 409 and adds spectrally shaped noise to decoded output to mask core coding artifacts. MD decoder and upmixer 410 includes decorrelating unit 405, upmixing unit 407 and spatial shaping and noise filling unit 408.

In an embodiment, the spectral shaping of the noise is implemented inside core decoder 409 using spectral shaping modules in core decoder 409. Note that noise estimating and spectral shaping parameter extracting unit 303 and a section of noise upmixer unit 304 in SPAR decoder 300 shown in FIG. 3 are also present inside core decoding unit 302 (units 402 and 403).

Note that noise estimating and spectral shaping parameter extracting unit 303 in SPAR decoder 300 shown in FIG. 3 is also present inside core decoding unit 302 (units 402). Core decoding unit 302 also has a single channel noise generator unit which uses a Gaussian white noise distribution as an excitation signal and spectrally shapes it as per the spectral parameters generated by noise estimating unit 402. This single channel noise generator can be easily modified into a multi-channel noise generator that generates multiple uncorrelated noise channels with same spectral shape by using a different seed for each channel for a gaussian white noise distribution. This multi-channel noise generator is shown as unit 403 in FIG. 4, and is equivalent to unit 304 in FIG. 3.

In this embodiment, decoder 409 decodes the representation of the W channel and noise estimating unit 402 estimates the noise in the decoded data. This noise estimate is used by unit 403 to generate the 4 uncorrelated noise channels with the same spectral shaping. The noise channels are generated based on a Gaussian white noise distribution with a different seed for each channel, thereby generating completely uncorrelated noise channels.

The SPAR decoder described above in reference to FIGS. 3 and 4 converts an FoA input audio signal representing an audio scene into a set of downmix channels and spatial parameters used to regenerate the input signal at the SPAR decoder. The downmix signals can vary from 1 to 4 channels and the parameters include prediction parameters PR, cross-prediction parameters C, and decorrelation parameters P. These parameters are calculated from a covariance matrix of a windowed input audio signal and are calculated in a specified number of frequency bands (e.g., 12 frequency bands).

An example representation of SPAR parameters extraction is as follows:

1. Predict all side signals (Y, Z, X) from the primary audio signal W using Equation [1]:

$$\begin{bmatrix} W \\ Y' \\ Z' \\ X' \end{bmatrix} = \begin{bmatrix} 1 & 0 & 0 & 0 \\ -pr_Y & 1 & 0 & 0 \\ -pr_Z & 0 & 1 & 0 \\ -pr_X & 0 & 0 & 1 \end{bmatrix} \begin{bmatrix} W \\ Y \\ Z \\ X \end{bmatrix}, \quad [1]$$

where, as an example, the prediction coefficient for the predicted channel Y' is calculated as shown in Equation [2]:

$$pr_Y = \frac{R_{YW}}{\max(R_{WW}, \epsilon)} \frac{1}{\max\left(1, \sqrt{|R_{YY}|^2 + |R_{ZZ}|^2 + |R_{XX}|^2}\right)}, \quad [2]$$

and $R_{YW}$=cov (Y, W) are elements of the input covariance matrix corresponding to channels Y and W. Similarly, the Z' and X' residual channels have corresponding parameters $pr_Z$ and $pr_X$. PR is the vector of the predictions coefficients PR=$[pr_Y, pr_Z, pr_X]^T$.

The above mentioned downmixing is also referred to as passive W downmixing in which W does not get changed during the downmix process. Another way of downmixing is active W downmixing which allows some mixing of Y, X and Z channels into the W channel as follows:

$$W' = W + f*pr_Y*Y + f*pr_Z*Z + f*pr_X*X, \quad [3]$$

where $f$ is computed as a function of normalized input covariance that allows mixing of some of the X, Y, channels into the W channel and $pr_Y$, $pr_X$, $pr_Z$ are the prediction coefficients. In an embodiment, $f$ can also be a constant (e.g., 0.50). In passive W, $f$=0 so there is no mixing of X, Y, Z channels into the W channel.

2. Remix the W channel and predicted (Y', Z', X') channels from most to least acoustically relevant, where remixing includes reordering or recombining channels based on some methodology, as shown in Equation [4]:

$$\begin{bmatrix} W \\ A' \\ B' \\ C' \end{bmatrix} = [\text{remix}] \begin{bmatrix} W \\ Y' \\ Z' \\ X' \end{bmatrix}. \quad [4]$$

Note that one embodiment of remixing could be re-ordering of the input channels to W, Y', X', Z', given the assumption that audio cues from left and right are more important than front to back, and lastly up and down cues.

3. Calculate the covariance of the 4-channel post-prediction and remixing downmix as shown in Equations [5] and [6]:

$$R_{pr} = [\text{remix}][\text{predict}] \cdot R \cdot [\text{predict}]^H [\text{remix}]^H, \quad [5]$$

$$R_{pr} = \begin{bmatrix} R_{WW} & R_{Wd} & R_{Wu} \\ R_{dW} & R_{dd} & R_{du} \\ R_{uW} & R_{ud} & R_{uu} \end{bmatrix}, \quad [6]$$

where dd represents the extra downmix channels beyond W (e.g., the $2^{nd}$ to N-dmx$^{th}$ channels), and u represents the channels that need to be wholly regenerated (e.g., $(N\_dmx+1)^{th}$ to 4 channels).

For the example of a WABC downmix ith 1-4 downmix channels, d and u represent the following channels, where the placeholder variables A, B, C can be any combination of X, Y, Z channels in FoA):

| N | Residual Channels | Predicted Channels |
|---|---|---|
| 1 | — | A', B', C' |
| 2 | A' | B', C' |
| 3 | A', B' | C' |
| 4 | A', B', C' | — |

4. From these calculations, determining if it is possible to cross-predict any remaining portion of the fully parametric channels from the residual channels being sent. The required extra C coefficients are:

$$C = R_{ud}(R_{dd} + I \max(\epsilon, tr(R_{dd}) * 0.005))^{-1}. \quad [7]$$

Therefore, C has the shape (1×2) for a 3-channel downmix, and (2×1) for a 2-channel downmix. One implementation of spatial noise filling does not require these C parameters and these parameters can be set to 0. An alternate implementation of spatial noise filling may also include C parameters.

5. Calculate the remaining energy in parameterized channels that must be filled by decorrelators. The residual energy in the upmix channels $Res_{uu}$ is the difference between the actual energy $R_{uu}$ (post-prediction) and the regenerated cross-prediction energy $Reg_{uu}$:

$$Reg_{uu} = CR_{dd}C^H, \quad [8]$$

$$Res_{uu} = R_{uu} - Reg_{uu}, \quad [9]$$

$$NResuu = \frac{Resuu}{\max(\varepsilon, RWW, \text{scale} * tr(|Resuu|))}, \quad [10]$$

$$P = \text{diag}\left(\sqrt{\max(0, \text{real}(\text{diag}(NResuu)))}\right), \quad [11]$$

where scale is a normalization scaling factor. Scale can be a broadband value (e.g., scale=0.01) or frequency dependent, and may take a different value in different frequency bands (e.g., scale=linspace (0.5, 0.01, 12) when the spectrum is divided into 12 bands).

Example Process

The coefficients in P in Equation dictate how much decorrelated components of W are used to recreate A, B and C channels, before un-prediction and un-mixing.

Figure 5:
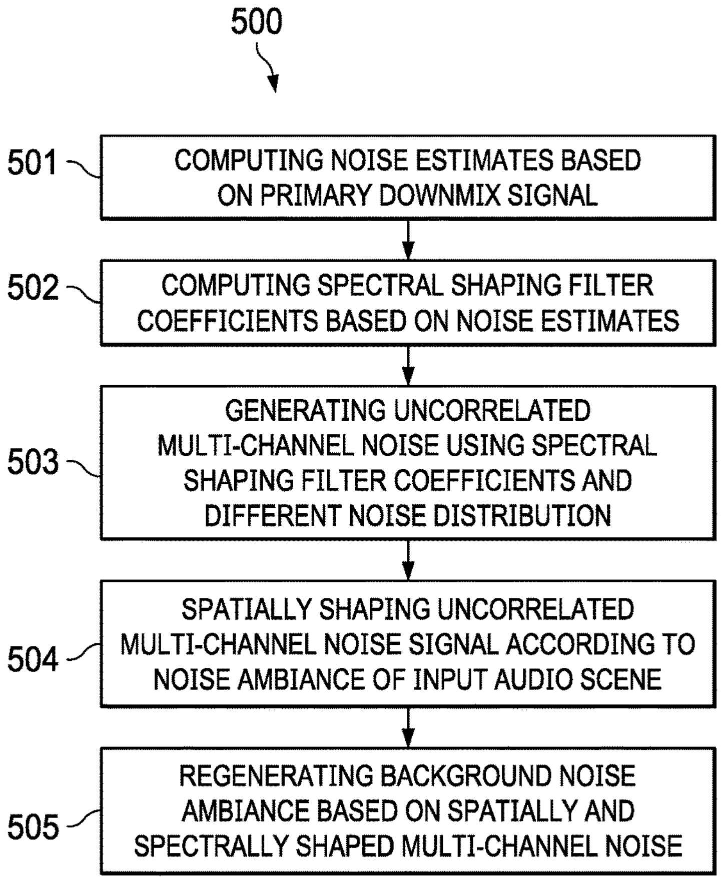
FIG. 5 is a flow diagram of process of regenerating background noise ambience in a multi-channel codec by generating spatial hole filling noise, according to an embodiment.

FIG. 5 is a flow diagram of process 500 of regenerating background noise ambience in a multi-channel codec by generating spatial hole filling noise, according to an embodiment. Process 500 can be implemented using, for example, device architecture 600 described in reference to FIG. 6.

Process 500 includes computing noise estimates based on a primary downmix channel (e.g., a FoA W channel) generated from an input audio signal representing a spatial audio scene with background noise ambience (501), computing spectral shaping filter coefficients based on the noise estimates (502), spectrally shaping the multi-channel noise signal using the spectral shaping filter coefficients and a noise distribution (e.g., Gaussian white noise), the spectral shaping resulting in a diffused multi-channel noise signal (e.g., completely diffused) with uncorrelated channels (503), spatially shaping the diffused uncorrelated multi-channel noise signal with uncorrelated channels based on a noise ambience of the spatial audio scene (504); and adding the spatially and spectrally shaped multi-channel noise signal to a multi-channel codec output to regenerate a background noise ambience of the input spatial audio scene (505). Each of these steps was described in detail in reference to FIGS. 1-4.

Example System Architecture

Figure 6:
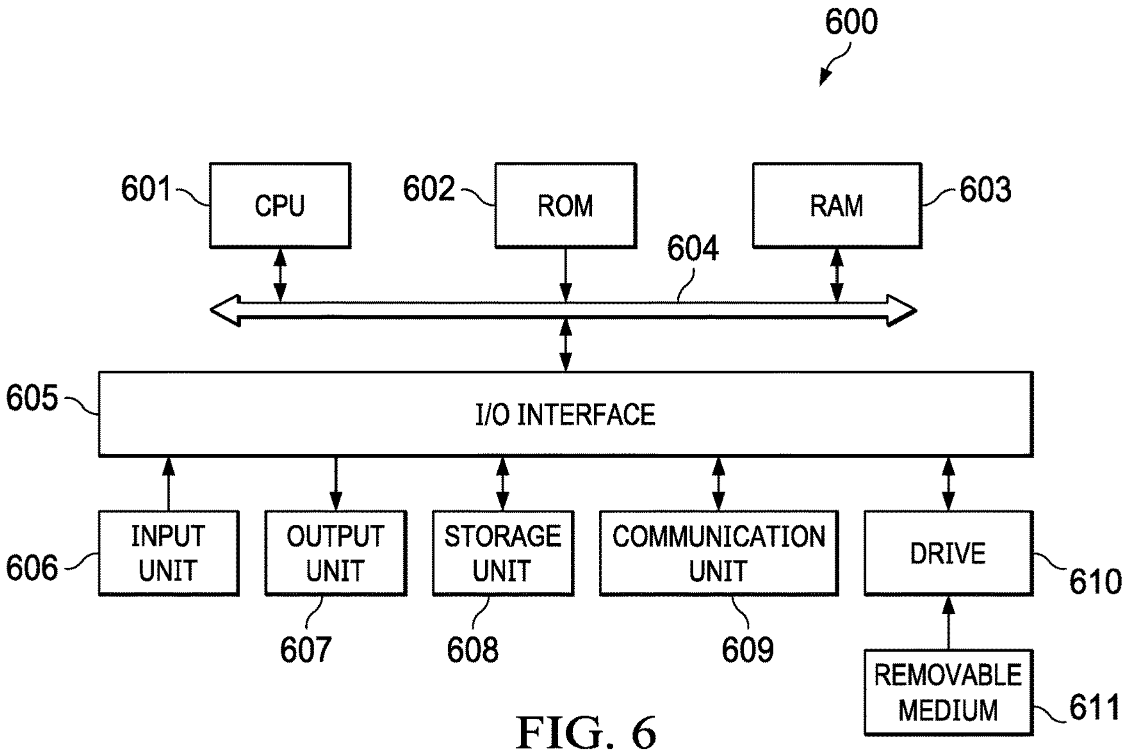
FIG. 6 is a block diagram of an example device architecture for implementing the features and processes described in reference to FIGS. 1-5, according to an embodiment.

FIG. 6 shows a block diagram of an example system 600 suitable for implementing example embodiments described in reference to FIGS. 1-5. System 600 includes a central processing unit (CPU) 601 which is capable of performing various processes in accordance with a program stored in, for example, a read only memory (ROM) 602 or a program loaded from, for example, a storage unit 608 to a random access memory (RAM) 603. In the RAM 603, the data required when the CPU 601 performs the various processes is also stored, as required. The CPU 601, the ROM 602 and the RAM 603 are connected to one another via a bus 604. An input/output (I/O) interface 605 is also connected to the bus 604.

The following components are connected to the I/O interface 605: an input unit 606, that may include a keyboard, a mouse, or the like; an output unit 607 that may include a display such as a liquid crystal display (LCD) and one or more speakers; the storage unit 608 including a hard disk, or another suitable storage device; and a communication unit 609 including a network interface card such as a network card (e.g., wired or wireless).

In some embodiments, the input unit 606 includes one or more microphones in different positions (depending on the host device) enabling capture of audio signals in various formats (e.g., mono, stereo, spatial, immersive, and other suitable formats).

In some embodiments, the output unit 607 include systems with various number of speakers. The output unit 607 can render audio signals in various formats (e.g., mono, stereo, immersive, binaural, and other suitable formats).

The communication unit 609 is configured to communicate with other devices (e.g., via a network). A drive 610 is also connected to the I/O interface 605, as required. A removable medium 611, such as a magnetic disk, an optical disk, a magneto-optical disk, a flash drive or another suitable removable medium is mounted on the drive 610, so that a computer program read therefrom is installed into the storage unit 608, as required. A person skilled in the art would understand that although the system 600 is described as including the above-described components, in real applications, it is possible to add, remove, and/or replace some of these components and all these modifications or alteration all fall within the scope of the present disclosure.

Various aspects of the disclosed embodiments may be appreciated from the following enumerated example embodiments (EEEs):

EE1. A method of regenerating background noise ambience in a multi-channel codec by generating spatial hole filling noise, the method comprises: computing noise estimates based on a primary downmix channel generated from an input audio signal representing a spatial audio scene with background noise ambience; computing spectral shaping filter coefficients based on the noise estimates; spectrally shaping the multi-channel noise signal using the spectral shaping filter coefficients and a noise distribution, the spectral shaping resulting in a diffused, multi-channel noise signal with uncorrelated channels; spatially shaping the diffused, multi-channel noise signal with uncorrelated channels based on a noise ambience of the spatial audio scene; and adding the spatially and spectrally shaped multi-channel noise to a multi-channel codec output to synthesize the background noise ambience of the spatial audio scene.

EE2. The method of EE1, wherein the spectral shaping is based on a spectral shape of the background noise ambience in a representation of a mid-channel of a mid-side (M/S) signal or W channel of a first order Ambisonics signal.

EE3. The method of EE1 or EE2, wherein each channel of the uncorrelated channels has a similar spectral shape as the other channels.

EE4. The method of any of the EEs 1-3, wherein spatially shaping the multi-n channel noise signal is based on covariance estimates of a decoded output of the multi-channel codec.

EE5. The method of any of the EEs 1-4, wherein spatially shaping the multi-channel noise signal is based on spatial metadata extracted from the input audio signal.

EE6. The method of any of the EEs 1-5, further comprising obtaining a spectral shape of the multi-channel noise signal by smoothing a gain of the multi-channel noise signal over time.

EE7. The method of any of the EEs 1-6, wherein a dynamic range of the multi-channel noise signal is limited based on one or more tunable thresholds.

EE8. The method of any of the EEs 1-7, wherein the multi-channel noise signal is added to the decoded multi-channel output to synthesize the input background noise ambience to mask spatial ambience collapse.

EE9. The method of any of the EEs 1-8, wherein the multi-channel noise signal is only added to parametrically upmixed multi-channel outputs.

EE10. The method of any of the EEs 1-9, wherein the multi-channel codec is an immersive voice and audio services (IVAS) codec.

EE11. The method of any of the EEs 1-10, wherein the multi-channel noise signal spatial shaping and noise addition is performed in a frequency banded or broadband domain.

EE12. The method of any of the EEs 1 to 11, wherein multi-channel noise signal is only added to high frequencies.

EE13. A system comprises: one or more processors; and a non-transitory computer-readable medium storing instructions that, upon execution by the one or more processors, cause the one or more processors to perform operations of any one of the EEs described above.

EE14. A non-transitory, computer-readable medium storing instructions that, upon execution by one or more processors, cause the one or more processors to perform operations of any one of the EEs described above.

In accordance with example embodiments of the present disclosure, the processes described above may be implemented as computer software programs or on a computer-readable storage medium. For example, embodiments of the present disclosure include a computer program product including a computer program tangibly embodied on a machine readable medium, the computer program including program code for performing methods. In such embodiments, the computer program may be downloaded and mounted from the network via the communication unit 609, and/or installed from the removable medium 611, as shown in FIG. 6.

Generally, various example embodiments of the present disclosure may be implemented in hardware or special purpose circuits (e.g., control circuitry), software, logic or any combination thereof. For example, the units discussed above can be executed by control circuitry (e.g., a CPU in combination with other components of FIG. 6), thus, the control circuitry may be performing the actions described in this disclosure. Some aspects may be implemented in hardware, while other aspects may be implemented in firmware or software which may be executed by a controller, microprocessor or other computing device (e.g., control circuitry). While various aspects of the example embodiments of the present disclosure are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

Additionally, various blocks shown in the flowcharts may be viewed as method steps, and/or as operations that result from operation of computer program code, and/or as a plurality of coupled logic circuit elements constructed to carry out the associated function(s). For example, embodiments of the present disclosure include a computer program product including a computer program tangibly embodied on a machine readable medium, the computer program containing program codes configured to carry out the methods as described above.

In the context of the disclosure, a machine readable medium may be any tangible medium that may contain, or store a program for use by or in connection with an instruction execution system, apparatus, or device. The machine readable medium may be a machine readable signal medium or a machine readable storage medium. A machine readable medium may be non-transitory and may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Computer program code for carrying out methods of the present disclosure may be written in any combination of one or more programming languages. These computer program codes may be provided to a processor of a general purpose computer, special purpose computer, or other programmable data processing apparatus that has control circuitry, such that the program codes, when executed by the processor of the computer or other programmable data processing apparatus, cause the functions/operations specified in the flowcharts and/or block diagrams to be implemented. The program code may execute entirely on a computer, partly on the computer, as a stand-alone software package, partly on the computer and partly on a remote computer or entirely on the remote computer or server or distributed over one or more remote computers and/or servers.

While this document contains many specific embodiment details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can, in some cases, be excised from the combination, and the claimed combination may be directed to a sub combination or variation of a sub combination. Logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A method of generating background noise ambience in a multi-channel codec, the method comprising:

computing, with at least one processor, from a primary downmix channel generated from an input multi-channel audio signal representing a spatial audio scene with background noise ambience, noise estimates of noise in the primary downmix channel;

computing, with the at least one processor, spectral shaping filter coefficients based on the noise estimates;

spectrally shaping, with the at least one processor, a multi-channel noise signal using the spectral shaping filter coefficients and a noise distribution, the spectral shaping resulting in a diffused, multi-channel noise signal with uncorrelated channels;

spatially shaping, with the at least one processor, the diffused, uncorrelated multi-channel noise signal with uncorrelated channels based on a noise ambience of the spatial audio scene; and outputting, with the at least one processor, the spatially and spectrally shaped multi-channel noise signal to synthesize the background noise ambience of the spatial audio scene.

2. A system of processing audio, comprising:

one or more processors; and a non-transitory computer-readable medium storing instructions that, when executed by the one or more processors, cause the one or more processors to:

compute, from a primary downmix channel generated from an input multi-channel audio signal representing a spatial audio scene with background noise ambience, noise estimates of noise in the primary downmix channel;

compute spectral shaping filter coefficients based on the noise estimates;

spectrally shape a multi-channel noise signal using the spectral shaping filter coefficients and a noise distribution, the spectral shaping resulting in a diffused, multi-channel noise signal with uncorrelated channels;

spatially shape the diffused, uncorrelated multi-channel noise signal with uncorrelated channels based on a noise ambience of the spatial audio scene; and output the spatially and spectrally shaped multi-channel noise signal to synthesize the background noise ambience of the spatial audio scene.

3. A non-transitory computer-readable medium storing instructions that, when executed by the one or more processors, cause the one or more processors to perform operations of claim 1.

* * * * *